J. T. KELLY.
PIPE UNION.
APPLICATION FILED JULY 1, 1909.

974,975.

Patented Nov. 8, 1910.

WITNESSES.

INVENTOR.

UNITED STATES PATENT OFFICE.

JOHN T. KELLY, OF BROOKLYN, NEW YORK, ASSIGNOR OF ONE-HALF TO GEORGE M. JONES, OF PITTSBURG, PENNSYLVANIA.

PIPE-UNION.

974,975.  Specification of Letters Patent.  Patented Nov. 8, 1910.

Application filed July 1, 1909. Serial No. 505,440.

*To all whom it may concern:*

Be it known that I, JOHN T. KELLY, a resident of Brooklyn, in the county of Kings and State of New York, have invented a new and useful Improvement in Pipe-Unions; and I do hereby declare the following to be a full, clear, and exact description thereof.

My invention relates to pipe unions, namely, couplings, for fitting pipes by means of a metal joint between two coupling members secured to the pipes and united by means of a coupling ring, nut or collar, or by direct bolting together of such members. Its purpose is to provide a cheap and strong coupling which is non-oxidizable, and therefore not liable to be fastened together by rust when in use and at the same time is adapted to maintain its non-oxidizable surface under high temperature, such as high steam heat to which lines of this character are subjected; these lines being often subjected to temperatures of several hundred degrees where steam under pressure is carried. To provide joints adapted to carry steam at such high temperature they have been made either entirely of brass or like metal adapted to stand high heats, or having at least one of its members formed of brass; but the use of brass parts makes the joints expensive as compared with such unions made of cast iron or steel, while they are by no means as strong as the iron or steel joints, and they are open to the objection that the two different metals expand and contract differently under the influence of heat and cold, and hence the joints are liable to open slightly and cause leakage, for example, leakage between the pipe sections and coupling members screwed onto or attached thereto, or in the sealed joint formed between the iron member and the brass member.

The object of my invention is to provide a coupling formed of iron or steel or like hard metal and yet to provide a joint which, while of great strength and inexpensive of manufacture, is not only not affected by rust, but will stand without injury the high temperatures to which these joints are exposed in connection with the pipe lines for steam and like uses.

It consists, generally stated, in a pipe union having its several members formed of iron or steel and having a coating of copper electrolytically deposited thereon, so forming a rustless joint between the meeting or sealing faces of the union and between the coupling member parts as well as with the pipes to which they are connected, which will resist the action of the steam or like heated fluid.

Figure 1:
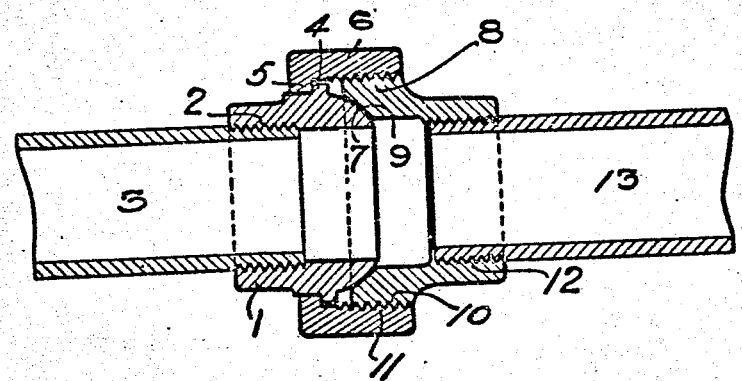
Figure 2:
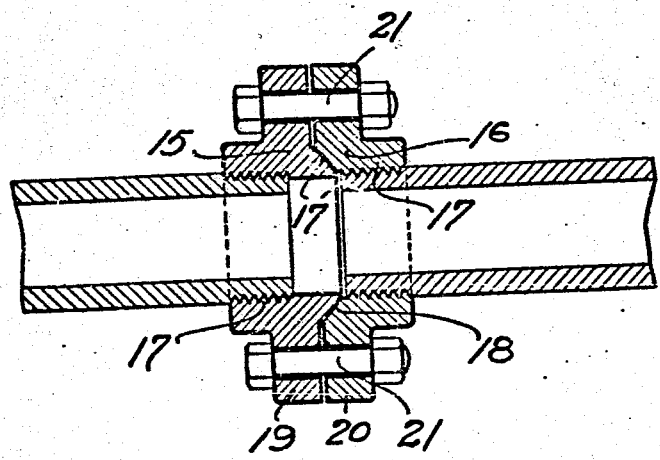

In the accompanying drawings Figure 1 is a sectional view of a coupling embodying the invention; and Fig. 2 is a longitudinal section illustrating my invention as applied to what is termed a flange union.

The invention is illustrated in Fig. 1 in connection with a union in which the two main members are united by means of a ring or collar. In such figure 1 illustrates the part usually termed the tail-piece, such tail-piece having the internally threaded portion 2 adapted to screw onto the pipe 3 and having the external shoulder 4 engaging with an internal shoulder 5 on the nut or collar 6, the tail-piece also having the inclined or beveled male seat 7 forming a metal tight joint with the spud 8, the spud having the beveled or inclined female seat 9 and having the external threaded face 10 engaging with the internal threaded face 11 of the nut 6, and such spud also having the internal threaded face 12 engaging with the pipe section 13. These parts are of the well known or any desired shape and are formed of what might be termed cast iron, this term including either iron or steel or like oxidizable metal suitable for the manufacture of the same. These parts are usually formed of cast iron, or a mixture of cast iron and steel which is subsequently malleableized to give greater strength thereto and somewhat soften the surface of the metal to provide for the easy cutting of the threads and finishing of the parts. The parts of the coupling as so formed are finished in suitable way to provide the threaded faces for union with the other parts, and the bearing faces or seats 7 and 9 forming the metal sealing joint properly or carefully turned and ground to give a perfect bearing surface between them when the two parts are drawn together, such as by means of the collar 6. After the finishing of the several parts, a coating of copper is electrolytically deposited over the entire surface of the different coupling members, that is, over the surface of all the members of the union including the bearing faces between the tail-piece and spud, the engaging faces of the tail-piece and nut, and the threaded faces of all the members as well as the parts connecting them. This is accomplished by placing the coupling members within the electrolytic bath and electrolytically depositing on such members a coating of copper of sufficient thickness for the purpose, the thickness of such coating being varied by the exposure in the bath. Such coating is illustrated by heavy lines around all the coated parts.

When the coupling is in use the spud and tail-piece are secured onto the pipe sections and the sealing faces or seats 7 and 9 of such members are drawn together by the threaded nut or collar, so forming a tight joint between such sealing faces. The coatings of copper on the two faces so brought into contact, provide a water or steam tight joint found to be very efficient in use and a joint which is rustless, so preventing the sticking of the parts together, no matter how long the joint may remain closed. In like manner the other connections between the parts such as the connections between the spud and tail-piece with the pipe sections, and the threaded connections between the spud and collar, as well as the shoulder connection between the tail-piece and collar are also rustless. The copper coating so applied to the several parts is adapted to stand a much higher temperature than the highest temperature of steam, and such coating is therefore preserved at any heat to which steam or like fluid can be raised. In forming the sealed joint, it will be seen that the two separate coatings, one upon the bearing face or seat 9 of the spud and the other upon the bearing face or seat 7 of the tail-piece insure sufficient body of soft metal between the relatively hard faces of the cast iron parts to insure a perfectly sealed joint.

In coating the parts by electrolytic-deposition a perfect coating is insured, free from any such imperfections as might be present in coating by molten bath, while as the coating forming the actual joint is deposited upon the bearing surfaces which have been previously turned and ground, they present practically perfect faces to receive the deposit of the copper, and any possible imperfections thereon are covered by the copper so deposited and a perfectly sealed joint is thus insured, while the thickness of the copper coating can be regulated. As the different parts of the joint are made of the same metal, cast iron and steel, the expansion and contraction are the same, so that there is no liability of leakage at the joints arising from difference in expansion and contraction such as where the parts are formed of different metals as above referred to. The cast iron or steel is also very much stronger than when its parts are made either wholly or in part of brass, and the cost of the same, as coated with copper, as above described, is much cheaper than such a joint, as the cost of depositing a coating on the surface of the several cast iron members, is relatively small. If desired, the several parts of the joints especially the spud and tail-piece may be malleableized and in doing so the surface of the metal is somewhat softened, so that the sealing faces or seats of the coupling member, when coated with copper, yield slightly and so aid in forming a more perfect joint.

In Fig. 2 I have illustrated the invention as applied to what is known as a flanged union. In this case two main members 15 and 16 are employed, each member having an internal threaded face 17 to which the pipe sections are connected while one member 15 has the bearing face or seat 17 and the other member has the bearing face or seat 18, the two members each having flanges 19 and 20 beyond their bearing faces and being united by bolts 21 as shown. These two members are formed of cast iron or steel and are finished in the same way, their threaded faces being cut and their bearing faces turned and ground and they are then placed in an electrolytic bath and coated with copper, as above described. They are connected up with the pipe sections in the ordinary way and their bearing faces brought into sealing contact by means of nuts and bolts, so forming the joint. Such flanged union has the same advantages as those above stated in connection with the ordinary threaded pipe union. While on account of the low cost of manufacture I prefer to coat the surfaces of all the members with copper, the invention can be employed with only one member so coated, such as the spud, illustrated in Fig. 1.

I am aware that cast iron pipe unions have been galvanized, i. e., dipped in a zinc bath. While this might protect pipe unions not subjected to heat, the high heat to which those pipe lines are subjected, when carrying steam or other highly heated fluids, acts upon the zinc coating and in a short time destroys the same, by melting, oxidation or otherwise, leaving the cast iron unprotected and liable to rust and corrode with all the objectionable features of an ordinary cast iron joint. Zinc is also a hard metal and is not adapted to form as perfect a joint as the soft copper, while it is exceedingly difficult in coating the pipe union with the molten zinc to produce the necessary smooth faces for sealing the joints between the members.

What I claim is:

1. In a pipe union, the combination of members having bearing faces adapted to be drawn into sealing contact, said members being formed of cast iron, and one of said members having a coating of copper deposited on the bearing face thereof.

2. In a pipe union, the combination of members having faces adapted to be drawn into sealing contact, said members being formed of cast iron and having a coating of copper deposited over the entire surface thereof.

In testimony whereof, I, the said JOHN T. KELLY, have hereunto set my hand.

JOHN T. KELLY.

Witnesses:
JNO. J. McGEE,
J. S. MATTIMORE.